United States Patent [19]

Hazlett

[11] Patent Number: 4,813,484

[45] Date of Patent: Mar. 21, 1989

[54] CHEMICAL BLOWING AGENTS FOR IMPROVED SWEEP EFFICIENCY

[75] Inventor: Randy D. Hazlett, Dallas, Tex.

[73] Assignee: Mobil Oil Corporation, New York, N.Y.

[21] Appl. No.: 138,176

[22] Filed: Dec. 28, 1987

[51] Int. Cl.$^4$ .................... E21B 33/138; E21B 43/22
[52] U.S. Cl. .................................. 166/270; 166/273; 166/274; 166/294; 166/300
[58] Field of Search ............... 166/270, 273, 274, 292, 166/294, 295, 300, 309; 106/87

[56] References Cited

U.S. PATENT DOCUMENTS

| | | | |
|---|---|---|---|
| Re. 30,935 | 5/1982 | Richardson et al. | 166/300 |
| 2,761,511 | 9/1956 | Billue | 166/292 |
| 2,866,507 | 12/1958 | Bond et al. | |
| 3,305,016 | 2/1967 | Lindblom et al. | |
| 3,508,612 | 4/1970 | Reisberg et al. | 166/274 |
| 3,599,717 | 8/1971 | McMillen | 166/273 |
| 3,908,760 | 9/1975 | Clampitt et al. | 166/246 |
| 3,977,470 | 8/1976 | Chang | 166/273 |
| 3,993,133 | 11/1976 | Clampitt | 166/263 X |
| 4,008,769 | 2/1977 | Chang | 166/274 |
| 4,232,741 | 11/1980 | Richardson et al. | 166/273 X |
| 4,300,634 | 11/1981 | Clampitt | 166/295 X |
| 4,331,543 | 5/1982 | Wilson et al. | 252/8.55 D |
| 4,450,010 | 5/1984 | Burkhalter et al. | 106/87 |
| 4,453,596 | 6/1984 | Conway et al. | 166/278 |
| 4,667,741 | 5/1987 | Phelps et al. | 166/274 |
| 4,676,318 | 6/1987 | Myers et al. | 166/292 X |
| 4,694,906 | 9/1987 | Hutchins et al. | 166/294 |
| 4,705,810 | 11/1987 | Millet et al. | 521/97 X |

*Primary Examiner*—George A. Suchfield
*Attorney, Agent, or Firm*—Alexander J. McKillop; Charles J. Speciale; Charles A. Malone

[57] ABSTRACT

A process for generating gas in-situ where a decomposable chemical blowing agent is utilized in combination with an aqueous medium. When a slug of the aqueous medium containing said blowing agent is injected into the formation, heat from the formation, coinjected activators, reservoir fluids, or formation mineralogy causes said blowing agent to decompose thereby generating a gas. This gas forms bubbles which close pores in a more permeable zone of a formation which causes a drive fluid to be diverted into a less permeable zone for removal of hydrocarbonaceous fluids therefrom. Bubbles can also be formed by incorporating a water thickening amount of a water soluble polymer or gel into an aqueous medium containing a decomposable chemical blowing agent. A foam can be made in-situ by placing into an aqueous medium, a surfactant and a decomposable chemical blowing agent. In-situ generated bubbles or foam can be used to divert a drive fluid into a formation's less permeable zone.

36 Claims, No Drawings

CHEMICAL BLOWING AGENTS FOR IMPROVED SWEEP EFFICIENCY

FIELD OF THE INVENTION

This invention relates to the recovery of oil from subterranean oil reservoirs or formations and more particularly to improved waterflooding operations involving the injection of a foamable aqueous liquid for mobility control.

BACKGROUND OF THE INVENTION

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

One difficulty often encountered in waterflooding operations is the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portions of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decrease its mobility to a value equal to or less than the mobility of the displaced reservoir oil, resulting in a "mobility ratio" of oil to water which is less than or equal to one. Many polymeric thickening agents have been proposed for use in such mobility control applications. One well known class of polymers which may be employed for this purpose is the group of polysaccharides produced by the action of bacteria of the genus Xanthomonas on carbohydrates as disclosed in U.S. Pat. No. 3,305,016 to Lindblom et al. This patent is incorporated herein by reference. As disclosed in this patent, these polysaccharides generally are employed in concentrations within the range of about 0.005–1.0 weight percent, with concentrations within the range of about 0.05–0.25 weight percent normally being preferred. Among the advantages attributed to these polysaccharides by Lindblom et al., are their usefulness in the presence of sodium chloride and other salts and their thermal stability and resistance to adsorption onto rock surfaces within a subterranean reservoir.

Another procedure for improving sweep efficiency involves the use of foams. A foam is a dispersion of a gas in a liquid with an extremely high dispersed phase volume, such that the system can essentially be regarded as a network of interconnected liquid films (J. J. Bikerman, Ind. Chem., 57, 56 [1965]). Foams find a variety of useful applications, including fire fighting (J. M. Perri in "Foams: Theory and Industrial Applications", J. J. Bikerman, Ed., Reinhold Publishing Corp., NY, 1953, Chapter 12), foam fracturing of petroleum reservoirs to improve oil recovery (M. W. Conway and L. R. Norman, U.S. Pat. No. 4,453,596), soil cleanup or detergency (J. J. Bikerman, "Foams"; Springer-Verlag Publishers, NY, 1973, page 254) froth flotation in minerals processing (R. B. Booth in "Foams: Theory and Industrial Applications", J. J. Bikerman, Ed., Reinhold Publishing Corp., NY, 1953, Chapter 13) and mobility control in miscible (D. C. Bond and O. C. Holbrook, U.S. Pat. No. 2,866,507) and thermal oil recovery (W. E. Brigham, O. P. Malito and S. K. Sanyal, "A Field Experiment of Steam Drive with In-Situ Foaming", DOE Report No. DOW/SF/11445-2 [1984]).

Richardson et al. in U.S. Pat. No. Re. 30,935 dated May 18, 1982 disclose initiating production from a gas well which is kept from producing by the hydrostatic pressure of liquid which it contains. Here, an aqueous liquid containing reactants form the nitrogen gas within the well. The gas displaces enough liquid out of the well to lower the hydrostatic pressure to less than the fluid pressure in the adjacent portion of the reservoir. Fluid is thus caused to flow from the reservoir to the well.

None of the methods above mentioned disclose use of a foam generated in-situ within a formation via a decomposable chemical blowing agent. Therefore, what is need is a method whereby a foam can be generated in-situ by a decomposable chemical blowing agent where said foam can be used for fluid diversion or mobility control.

SUMMARY

A method is disclosed for producing hydrocarbonaceous fluids from a subterranean formation. In the practice of this invention, a decomposable chemical blowing agent is utilized in combination with an aqueous medium. When a slug of the aqueous medium containing said blowing agent is injected into the formation, heat from the formation, coinjected activators, reservoir fluids, or formation mineralogy causes said blowing agent to decompose thereby generating a gas. This gas forms bubbles which close pores in a more permeable zone of a formation.

In another embodiment, bubbles can be formed by incorporating a water-thickening amount of a water soluble polymer or gel into a slug of an aqueous medium containing a decomposable chemical blowing agent. After the bubbles have formed and closed pores in a more permeable zone, a drive fluid is directed into a less permeable zone for removal of hydrocarbonaceous fluids therefrom.

In yet another embodiment, a surfactant and decomposable chemical blowing agent are added into a slug of an aqueous medium. Thereafter, said slug is injected into a formation where formation conditions cause said chemical blowing agent to decompose thereby liberating a gas sufficient to cause a foam to form. The generated foam blocks pores in the more permeable zone of the formation which causes a subsequent waterflood to be directed to a less permeable zone of the formation. Diversion of the waterflood to the less permeable formation zone causes hydrocarbonaceous fluids to be removed from that zone.

DESCRIPTION OF THE PREFERRED EMBODIMENTS

In the practice of this invention, a water thickening amount of a water-soluble polymer or gel, a surfactant, and a decomposable chemical blowing agent are placed into an aqueous medium. The aqueous medium can comprise fresh water, formation brine, water, or brackish water.

As above mentioned, a water soluble polymer which can be used herein is disclosed in U.S. Pat. No. 3,305,016 which issued to Lindblom et al. Clampitt et al. in U.S. Pat. No. 3,908,760 disclose the use of water soluble biopolysaccharides. This patent is incorporated by reference herein. Phelps et al. in U.S. Pat. No. 4,667,741 issued May 26, 1987, disclosed use of a water soluble scleroglucan polysaccharide which can be used herein. This patent is also incorporated by reference herein. The amount of polymer should comprise a water thickening amount sufficient to form stable bubbles sufficient to block pores in a formation's more permeable zone. Gas for these bubbles is supplied by the decomposition of the chemical blowing agent which will be discussed later. Afterwards, a drive fluid can be injected into the less permeable zone of the formation and hydrocarbonaceous fluids can be removed therefrom.

Foam-forming surfactants suitable for use in the present invention can comprise substantially any which are capable of being dissolved or dispersed in an aqueous liquid solution containing the nitrogen containing compound and any added activator or inhibitor and remaining substantially inert during the nitrogen-gas-producing reaction of the nitrogen containing compounds. Examples of suitable surfactants comprise nonionic and anionic surfactants, commercially available sodium dodecylbenzene sulfonates, e.g., Siponate DS-10 available from American Alcolac Company, mixtures of the Siponate or similar sulfonate surfactants with sulfated polyoxyalkylated alcohol surfactants, e.g., the NEODOL sulfate surfactants available from Shell Chemical Company; sulfonate sulfate surfactant mixtures, e.g., those described in the J. Reisberg, G. Smith and J. P. Lawson U.S. Pat. No. 3,508,612; petroleum sulfonates available from Bray Chemical Company; Bryton sulfonates available from Bryton Chemical Company; Petronates and Pyronates available from Sonnoborn Division of Witco Chemical Company; fatty acid and tall oil acid soaps, e.g., Actynol Heads from Arizona Chemical Company; nonionic surfactants, e.g., Triton X100; and the like surfactant materials which are soluble or dispersible in aqueous liquids. These surfactants are disclosed in U.S. Pat. No. Re. 30,935 which issued to Richardson et al. on May 18, 1982. This patent is incorporated herein by reference.

Chemical blowing agents which can be utilized herein include dinitrosopentamethylenetetramine (DNPT), blends of sodium hydrogen carbonate and nitrogen releasing agents such as p-toluene sulfonyl hydrazide, and p,p'-oxybis (benzenesulfonyl hydrazide). Other chemical blowing agents which can be utilized include azodicarbonamide, and alkali metal salts of azodicarboxylic acid.

DNPT and sodium hydrogen carbonate can be used in conjunction with normal waterflooding operations. Since DNPT is only slightly soluble in cold water, warm water is required to achieve significant water solubility. Warm water can be obtained by preheating water to be injected or reinjection of warm produced water. Enhancement of the low temperature solubility of DNPT can be obtained by the use of chemicals. Said chemicals include dimethylformamide (DMF) and dimethylsulfoxide (DMSO). Should it be desired to accelerate the decomposition of DNPT in-situ, weak acids such as ammonium sulfate or acetic anhydride can be added to the formulation. As will be understood by those skilled in the art, the amount of chemical utilized will depend upon such factors as the amount and temperature of water utilized, chemical composition of the water, the amount of DNPT utilized, and the reservoir pressure.

Although sodium hydrogen carbonate and other bicarbonate foaming agents can be utilized, they are limited by an equilibrium which reduces yield with increasing pressure. To overcome this limitation, bicarbonate decomposition can be pH driven with formulations containing suitable compounds for pH depression with temperature increase. One such compound is the nitrogen releasing blowing agent, p-toluene sulfonyl hydrazide. Bicarbonate decomposition generates carbon dioxide. The addition of a suitable amount of p-toluene sulfonyl hydrazide, which liberates water soluble, acidic byproducts upon decomposition, causes substantially increased volumes of carbon dioxide to be released from solution due to bicarbonate decomposition.

Azodicarbonamide similar to DNPT is soluble in water only at elevated temperatures. Since azodicarbonamide is available in powder form with average particle size in the micron range, solid dispersions can be utilized. A dispersion can be made with adequate mixing by placing micron sized azodicarbonamide in a solution containing a suitable surfactant. The amount of azodicarbonamide should be sufficient to create the volume of gas required to obtain a fluid diversion effect. One such class of surfactants is alkyl naphthalene sulfonates, which can be purchased from GAF as the Nekal series, located in New York. Should it be desired to accelerate the decomposition of azodicarbonamide, an alkali carbonate can be utilized to obtain decomposition from the injection point to a desired distance in the formation. Alkali carbonates which can be utilized include sodium carbonate and potassium carbonate. Thus, azodicarbonamide will prove to have enhanced potential for use in carbonate reservoirs. Azodicarbonamide can be included in a microemulsion for injection into the formation. A method for making a microemulsion is disclosed in U.S. Pat. No. 4,008,769 which issued to Chang on Feb. 22, 1977. This patent is incorporated by reference herein.

Where an alkaline flood is utilized, the sodium salt of azodicarboxylic acid can be used as a chemical blowing agent. This blowing agent can be formed on site by the treatment of azodicarbonamide with sodium hydroxide and alkali carbonate with resulting ammonia evolution. When heated, this salt liberates nitrogen and carbon dioxide, yet it is very stable at room temperature in basic solutions having a pH greater than 12. Surfactant addition can be reduced or even eliminated in some instances due to surfactant production in-situ. The pH decline from hydroxide consumption will accelerate the foam decomposition reaction. Toluene sulfonyl hydrazide and p,p'-oxybis(benzenesulfonyl hydrazide) also develop water solubility at high pH, but the modified azodicarbonamide is preferred.

In one embodiment of this invention, any one of the chemical blowing agents above mentioned can be incorporated into an aqueous medium. The amount of blowing agent utilized will vary from about 0.05% to about 0.5% by weight. The gas generated upon decomposition will be sufficient to form gas as individual bubbles but insufficient to cause foam to form at typical reservoir pressures. Since the carrier fluid for the chemical blowing agent is an aqueous medium, bubbles which nucleate will do so in preferential pathways for water flow. For constant fluid injection rates, pore blocking and fluid diversion will result in localized increase in flow resistance. Since the decomposing chemical agent releases a gas which causes bubbles to form and block pores within a more permeable zone of the formation, the fluid utilized in the flood is directed to a less permeable zone in the formation. Diversion of fluid to a less permeable zone in the formation allows said fluid to remove hydrocarbonaceous fluids from the less permeable zone. If it is desired to create additional gas, the amount of chemical blowing agent can be increased.

A waterflooding method which can be used herein is disclosed in U.S. Pat. No. 4,331,543 which issued on May 25, 1982. An alkaline-sulfonate waterflood which can be utilized herein is detailed in U.S. Pat. No. 3,977,470 which issued to Chang on Aug. 31, 1976. An alternate flood process for recovering petroleum is taught in U.S. Pat. No. 3,599,717 which issued to McMillen on Aug. 17, 1971. These patents are hereby incorporated by reference herein.

In another embodiment, a chemical blowing agent and a surfactant are added into an aqueous medium in an amount sufficient to create a foam at reservoir conditions. The amount of chemical blowing agent utilized will be from about 0.51% to about 5.0% by weight. The amount of surfactant utilized will be an amount sufficient for foam stabilization and will generally be from about 0.1% to about 2% by weight. After mixing the blowing agent and surfactant together in an aqueous medium, a slug of the aqueous medium is injected into the formation. Once the slug has reached a predetermined location within the formation, the chemical blowing agent decomposes thereby liberating sufficient gas to create a foam. The foam which is generated is sufficient to close pores in a more permeable zone of a formation. A subsequent fluid injection derived from a waterflood, an alkaline flood, or a water-alternating-gas flood is then diverted to a less permeable zone of a formation where hydrocarbonaceous fluids are removed therefrom by the enhanced sweep.

In both embodiments, the chemical blowing agent is selected on the basis of reservoir temperature, mineralogy, depth, and environmental conditions. As required, pH buffers, accelerators, or inhibitors can be incorporated into the aqueous chemical slug prior to injection into the formation or reservoir. Choice of accelerators or inhibitors would be specific to the selected blowing agent. Accelerators which can be used for azodicarbonamide include alkali carbonates, basic metal salts of lead, cadmium, or zinc such as dibasic lead phthalate, and polyols such as glycols and glycerol. Inhibitors which can be utilized include barium salts and neutral pH buffers. Accelerators which can be used for DNPT include mineral acids and salts of mineral acids such as zinc chloride. Stabilizers which can be used for DNPT include oxides, hydroxides, or carbonates of calcium, barium, zinc, or magnesium. The size of the chemical slug would depend upon the extent of the prescribed treatment area. The injection rate of the chemical slug should be sufficient to allow fluid placement into the zone or zones desired to be treated prior to significant gas release. Bubbles or foam generated in a high permeability zone will lead to flow diversion and enhanced sweep of the formation or reservoir.

In order to confirm the effectiveness of these embodiments, the following tests were run.

TEST I 50 cc of a pH 5 acetic acid/sodium acetate buffer solution was prepared to which 0.25 grams of dinitrosopentamethylenetetramine and 0.25 grams of dodecylbenzene sulfonate surfactant were added. A water soluble fluorescent dye was also added. A rectangular glass capillary (1 cm×0.1 cm) was packed with 80-120 mesh cryolite sand. The pack was saturated with 3.4% NaCl, yielding a transparent, porous medium. 0.5 pore volumes of chemical solution was injected into the pack. The subsequent evolution of nitrogen within the quiescent pack was recorded via a time-lapse video camera system. Bubble production resulted in dramatic refractive index alteration. Significant gas evolution had occurred at room temperature at this pH within 1-2 hours. 24 hours later, the capillary was opaque on the portion containing the blowing agent. A transition zone was visibly apparent where a moderate amount of nucleation had occurred. Far from the transition zone, the pack was still transparent.

TEST II

A representative synthetic field brine (9.47 g/l NaCl, 3.25 g/l $MgCl_2.2H_2O$, 3.53 g/l $CaCl_2.2H_2O$) was prepared to which a portion dinitrosopentamethylenetetramine (Olin "OPEX 100") and an alpha olefin sulfonate surfactant (Shell AOS 1416) were added in quantities sufficient to yield 0.5% levels by weight of both. A 2 foot, 10 milliDarcy Texas cream carbonate core was saturated with synthetic brine. Brine injection was initiated at 500 psi back pressure and 125° F. oven temperature at a linear velocity of 4 ft/day. Brine with chemical was then injected, maintaining the same throughput. Pressure drop was monitored for a total of 5.8 pore volumes solution injected. Material balance data indicated fluid saturations within the core. During the course of chemical injection, flow resistance increased by 200% with the final in-situ gas saturation of only 6.5%. CT-scanner data confirmed a saturation distribution consistent with delayed blowing agent decomposition.

Obviously, many other variations and modifications of this invention as previously set forth may be made without departing from the spirit and scope of this invention as those skilled in the art readily understand. Such variations and modifications are considered part of this invention and within the purview and scope of the appended claims.

I claim:

1. A method for producing hydrocarbonaceous fluids from a subterranean formation comprising:
    (a) injecting an aqueous slug into said formation which fluid contains
        (i) water,
        (ii) a surfactant, and
        (iii) a decomposable chemical blowing agent;
    (b) causing said chemical blowing agent to decompose in-situ thereby generating gas in an amount and rate sufficient to form a foam with said surfactant; and (c) foaming said aqueous slug and injecting thereafter a drive fluid thereby displacing hydrocarbonaceous fluids from said formation.

2. The method as recited in claim 1 where said water comprises fresh water, formation brine, sea water, or brackish water.

3. The method as recited in claim 1 where said chemical blowing agent is dinitrosopentamethylenetetramine.

4. The method as recited in claim 1 wherein said chemical blowing agent is azodicarbonamide.

5. The method as recited in claim 1 where said chemical blowing agent is azodicarbonamide where decomposition is accelerated by alkali carbonates.

6. The method as recited in claim 1 where said chemical blowing agent is an alkali metal salt of azodicarboxylic acid which upon decomposition liberates nitrogen and carbon dioxide gases.

7. The method as recited in claim 1 where said chemical blowing agent is p,p'-oxybis(benzenesulfonyl hydrazide).

8. The method as recited in claim 1 where said aqueous slug is injected into said formation by at least one injection well.

9. The method as recited in claim 1 where hydrocarbonaceous fluids are produced from said formation by at least one production well.

10. The method as recited in claim 1 where said aqueous slug contains therein a pH adjustor, an accelerator, or an inhibitor sufficient to provide for variable propagation distances within said formation prior to foam generation.

11. The method as recited in claim 1 where said aqueous slug is utilized during a waterflood, an alkaline flood, or a water-alternating-gas oil recovery method.

12. The method as recited in claim 1 where said aqueous slug is coinjected with the drive fluid.

13. The method as recited in claim 1 wherein said chemical blowing agent formulation is sodium hydrogen carbonate and p-toluene sulfonyl hydrozide which decompose to release nitrogen and carbon dioxide gases.

14. A method for producing hydrocarbonaceous fluids from a subterranean formation comprising:

(a) injecting an aqueous slug into said formation which fluid contains
 (i) water, and
 (ii) a decomposable chemical blowing agent;

(b) causing said chemical blowing agent to decompose in-situ thereby generating gas in an amount and rate sufficient to form bubbles sufficient to block pores in a more permeable zone of a formation; and (c) injecting a drive fluid thereby displacing hydrocarbonaceous fluids from said formation.

15. The method as recited in claim 14 where said water comprises fresh water, formation brine, sea water, or brackish water.

16. The method as recited in claim 14 where said chemical blowing agent is dinitrosopentamethylenetetramine.

17. The method as recited in claim 14 where said chemical blowing agent is azodicarbonamide.

18. The method as recited in claim 14 where said chemical blowing agent is azodicarbonamide where decomposition is accelerated by alkali carbonates.

19. The method as recited in claim 14 where said chemical blowing agent is an alkali metal salt of azodicarboxylic acid which upon decomposition liberates nitrogen and carbon dioxide gases.

20. The method as recited in claim 14 where said chemical blowing agent is p,p'-oxybis(benzenesulfonyl hydrazide).

21. The method as recited in claim 14 where said aqueous slug is injected into said formation by at least one injection well.

22. The method as recited in claim 14 where hydrocarbonaceous fluids are produced from said formation by at least one production well.

23. The method as recited in claim 14 where said aqueous slug contains therein a pH adjustor, an accelerator, or an inhibitor sufficient to provide for variable propagation distances within said formation prior to foam generation.

24. The method as recited in claim 14 where said aqueous slug is utilized during a waterflood, an alkaline flood, or a water-alternating-gas oil recovery method.

25. The method as recited in claim 14 where said aqueous slug is coinjected with the drive fluid.

26. The method as recited in claim 14 wherein said chemical blowing agent formulation is sodium hydrogen carbonate and p-toluene sulfonyl hydrazide which decompose to release nitrogen and carbon dioxide gases.

27. A method for producing hydrocarbonaceous fluids from a subterranean formation comprising:

(a) injecting an aqueous slug into said formation which fluid contains
 (i) water
 (ii) a water thickening amount of a water soluble polymer or gel
 (iii) a decomposable chemical blowing agent;

(b) causing said chemical blowing agent to decompose in-situ thereby generating gas in an amount and rate sufficient to form stable bubbles sufficient to block pores in a more permeable zone of a formation; and (c) injecting a fluid drive thereby displacing hydrocarbonaceous fluids from a less permeable zone of the formation.

28. The method as recited in claim 27 where said water comprises fresh water, formation brine, sea water, or brackish water.

29. The method as recited in claim 27 where said chemical blowing agent is dinitrosopentamethylenetetramine.

30. The method as recited in claim 27 where said chemical blowing agent is azodicarbonamide.

31. The method as recited in claim 27 where said chemical blowing agent is azodicarbonamide where decomposition is accelerated by alkali carbonates.

32. The method as recited in claim 27 where said chemical blowing agent is p,p'-oxybis(benzenesulfonyl hydrazide).

33. The method as recited in claim 27 where said aqueous slug contains therein a pH adjustor, an accelerator, or an inhibitor sufficient to provide for variable propagation distances within said formation prior to foam generation.

34. The method as recited in claim 27 where said aqueous slug is utilized during a waterflood, an alkaline flood, or a water-alternating-gas oil recovery method.

35. The method as recited in claim 27 where said chemical blowing agent formulation is sodium hydrogen carbonate and p-toluene sulfonyl hydrazide which decompose to release nitrogen and carbon dioxide gases.

36. The method as recited in claim 27 where said chemical blowing agent is an alkali metal salt of azodicarboxylic acid which upon decomposition liberates nitrogen and carbon dioxide gases.

* * * * *